United States Patent [19]

Emery et al.

[11] Patent Number: 4,581,264

[45] Date of Patent: Apr. 8, 1986

[54] PROCESS FOR EXTRUDING AN ARTICLE FROM AN AMIDE-IMIDE COPOLYMER AND THE RESULTANT ARTICLE

[75] Inventors: Donald B. Emery, Warrenville; Brian C. Connolly, Aurora, both of Ill.

[73] Assignee: Standard Oil Company (Indiana), Chicago, Ill.

[21] Appl. No.: 595,273

[22] Filed: Mar. 30, 1984

[51] Int. Cl.[4] .......................... B29C 47/40; B29C 47/12; C08G 69/26

[52] U.S. Cl. .................................... 428/36; 138/177; 264/176 R; 264/211; 425/204; 425/461; 428/332; 428/473.5; 525/180; 528/350

[58] Field of Search .................... 264/211, 349, 51, 53, 264/54; 428/36, 332, 473.5; 138/177; 264/176 R; 425/204, 461; 525/180; 528/350

[56] References Cited

U.S. PATENT DOCUMENTS

| | | | |
|---|---|---|---|
| 3,347,828 | 10/1967 | Stephens et al. | 528/224 X |
| 3,522,628 | 8/1970 | Eberle et al. | 264/53 X |
| 3,573,260 | 3/1971 | Morello | 528/351 X |
| 3,661,832 | 5/1972 | Stephens | 528/351 X |
| 3,843,757 | 10/1974 | Ehrenfreund et al. | 264/54 X |
| 3,847,867 | 11/1974 | Heath et al. | |
| 3,943,107 | 3/1976 | Seltzer et al. | 528/350 X |
| 4,016,140 | 4/1977 | Morello | 528/350 X |
| 4,051,109 | 9/1977 | Barr et al. | 528/219 X |
| 4,073,773 | 2/1978 | Banucci et al. | 264/349 X |
| 4,186,263 | 1/1980 | Morello | 528/350 X |
| 4,232,142 | 11/1980 | Barr et al. | 528/125 |
| 4,238,538 | 12/1980 | Manwiller | 264/211 X |
| 4,291,149 | 9/1981 | Keske et al. | 528/350 X |
| 4,302,413 | 11/1981 | Howe et al. | 264/211 X |
| 4,309,528 | 1/1982 | Keske et al. | 528/350 X |
| 4,320,041 | 3/1982 | Abe et al. | 264/349 X |
| 4,323,493 | 4/1982 | Keske et al. | 528/350 X |
| 4,348,513 | 9/1982 | Keske et al. | 528/350 X |
| 4,409,167 | 10/1983 | Kolouch et al. | 264/349 X |
| 4,421,907 | 12/1983 | Schmidt et al. | 264/349 X |
| 4,443,591 | 4/1984 | Schmidt et al. | 264/349 X |
| 4,443,592 | 4/1984 | Schmidt et al. | 264/349 X |
| 4,467,011 | 8/1984 | Brooks et al. | 428/473.5 X |

OTHER PUBLICATIONS

*Whittington's Dictionary of Plastics*, by Lloyd R. Whittington Stamford Conn., Technomic, ©1968, Preface; pp. 101 and 157.

*SPI Plastics Engineering Handbook* New York, Reinhold, 1954, p. 103.

Martelli, Fabrizio "Twin Screw Extruders—A Separate Breed", in *SPE Journal*, 1971—vol. 27, pp. 25–30.

McKelvey, James M. *Polymer Processing*, New York, John Wiley and Sons, ©1962, pp. 1–5.

Primary Examiner—Philip Anderson
Attorney, Agent, or Firm—Robert G. Ladd; William H. Magidson; William T. McClain

[57] ABSTRACT

A process for the manufacture of extruded articles by extruding polyamide-imide polymers and copolymers through melt flow channels and extrusion dies at ever increasing shear rates ranging from 0.1 sec$^{-1}$ to about 2000 sec$^{-1}$. The extruder barrel and melt flow channel temperatures range from about 480° to about 600° F. and the extrusion die temperatures range from about 575° to about 680° F. Also, the addition of polyetherimides and polysulfones is disclosed. Thin films, thin sheets and hollow tubes are disclosed. All these articles are useful in engineering applications requiring high temperature resistant plastics. Useful applications include use in the aerospace and automobile industry.

40 Claims, 2 Drawing Figures

PROCESS FOR EXTRUDING AN ARTICLE FROM AN AMIDE-IMIDE COPOLYMER AND THE RESULTANT ARTICLE

This invention relates to processes for extrusion molding of articles of manufacture from amide-imide polymers, copolymers and their amic acids. More particularly, this invention relates to processes for extrusion molding of articles of manufacture which could not be injection molded from amide-imide polymers and copolymers.

BACKGROUND

Amide-imide polymers and copolymers are a relatively new class of organic compounds known for their solubility in nitrogen-containing solvents when in the largely polyamide form. In the past, the major application of these amide-imide polymers has been as wire enamels. This is illustrated in U.S. Pat. Nos. 3,661,832 (1972), 3,494,890 (1970) and 3,347,828 (1967). Amide-imide polymers and copolymers have also been found useful in molding applications as shown in U.S. Pat. Nos. 4,016,140 (1977) and 3,573,260 (1971). Both are incorporated herein by reference. These polyamides are known for their outstanding mechanical properties, but they are also difficult to process.

Using prior art processes, it has been impossible to extrusion mold thin films, thin sheets, and thick sheets from these polyamide-imides or to produce thick parts used as tubes and pipes. The art has been looking for useful extrusion processes to manufacture films, having a thickness of about 1 to about 15 mils, from these polyamide imides, and thin sheets of about 10 to about 250 mil thickness. Likewise, the art has been looking to produce tubes and pipes having a wall thickness of about 0.05 inches to about 0.25 inches and with outside diameter of about 0.25 inches to about 2 inches made from polyamide-imides.

The general object of this invention is to provide an extrusion molding process for the manufacture of molded products which cannot be prepared by injection molding or by extrusion processes known in the prior art. A particular object of this invention is to provide a process for the extrusion of thin films, having a thickness of about 1 to about 15 mils, the extrusion of thin sheets, having a thickness of about 10 to about 250 mils, and the extrusion of hollow tubes with outside diameters of about 0.25 inches to about 2 inches and a wall thickness of about 0.05 inches to about 0.25 inches are also objects of this invention.

A more specific object is to provide a process for extruding thin films and thick tubes and pipes by extruding the amic acid and amide-imide polymer through melt channels and extrusion dies at continuously increasing shear rates and at temperatures of about 575° F. to about 680° F.

Figure 1:
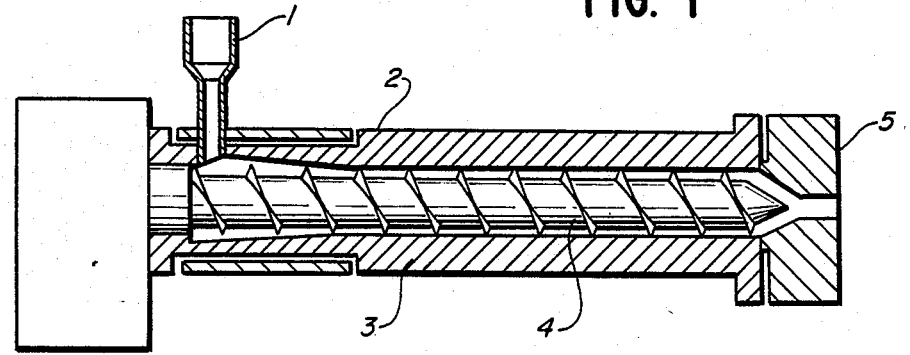
FIG. 1 is a schematic vertical-sectional side view of a corotating, intermeshing twin-screw extruder for use in the practice of the process of this invention.

In our molding process, the polyamide-imides are initially in the amic acid form having a molecular weight of about 7–13,000 and having, in their molecule, units of:

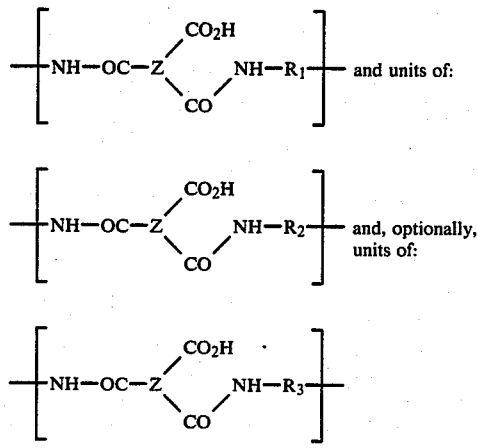

and units of:

and, optionally, units of:

wherein the free carboxyl groups are ortho to one amide group, Z is an aromatic moiety containing 1 to 4 benzene rings or lower-alkyl-substituted benzene rings, $R_1$, $R_2$ and $R_3$ are the same for homopolymers and are different for copolymers and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages, such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—.

Said polyamides are capable of substantially complete imidization by heating by which they form the polyamide-imide structure having, to a substantial extent, recurring units of:

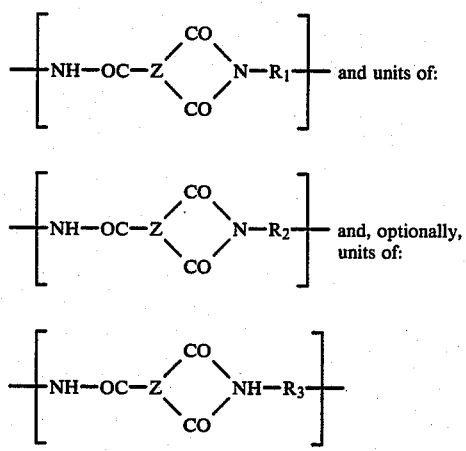

and units of:

and, optionally, units of:

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The amide-imide copolymer comprises units of:

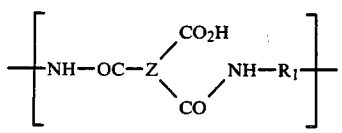

and units of:

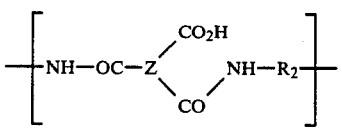

wherein one carbonyl group is meta to and one carbonyl group is para to each amide group and wherein z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbons joined directly or by stable linkages selected from the group consisting of —O—, methylene,

—$SO_2$—, and —S— radicals and where said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit. Also, the amide-imide polymers and copolymers comprise A units of:

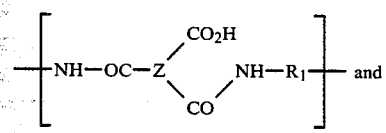 and

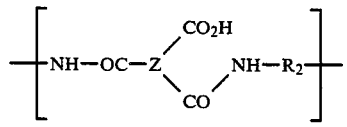

wherein the free carboxyl groups are ortho to one amide group and comprising B units of:

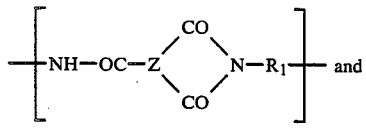 and

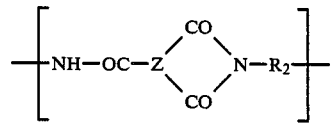

wherein one carbonyl group is meta to, and one carbonyl group is para to each amide group and wherein Z is a trivalent benzene ring or lower-alkyl-substituted trivalent benzene ring, $R_1$ and $R_2$ are the same or are different and are divalent aromatic hydrocarbon radicals or from 6 to about 10 carbon atoms or two divalent aromatic hydrocarbon radicals of from 6 to about 10 carbon atoms joined directly or by stable linkages selected from the group consisting of —O—, methylene, —CO—, —$SO_2$—, and —S— radicals and wherein the proportions of A and B units run from about 1 mole percent A units and about 99 mole percent B units to about 99 mole percent A units and about 1 mole percent B units and wherein the $R_1$ and $R_2$ containing components of the A and B units run from about 10 mole percent $R_1$ containing components and about 90 mole percent $R_2$ containing components to about 90 mole percent $R_1$ containing components and about 10 mole percent $R_2$ containing components.

The polyamide-imide copolymers are prepared from an anhydride-containing substance and a mixture of wholly- or partially-aromatic primary diamines. Usefully, the anhydride-containing substance is an acyl halide derivative of the anhydride of an aromatic tricarboxylic acid which contains 1 to 4 benzene or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and more preferably, the substance is the acyl chloride derivative of trimellitic acid anhydride (4-TMAC).

We can use a single diamine but usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —$SO_2$—, —CO—, or methylene group. When three diamines are used, they are preferably selected from the class composed of:

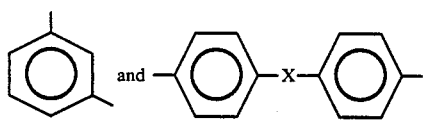

said X being an —O—, —$CH_2$—, or —SO— group. More preferably, the mixture of aromatic primary diamines is in the one-component or two-component system and is composed of metaphenylenediamine and p,p'-oxybis(aniline) and metaphenylenediamine, or p,p'-sulfonylbis(aniline) and p,p'-methylenebis(aniline). Most preferably, the mixture of primary aromatic diamines contains metaphenylenediamine and p,p'-oxybis-(aniline). In the one-component system, the preferred diamines are oxybis(aniline) or metaphenylenediamine. The aromatic nature of the diamines provides the excellent thermal properties of the homopolymer copolymers while the primary amine groups permit the desired imide rings and amide linkages to be formed.

Usually, the polymerization or copolymerization is carried out in the presence of a nitrogen-containing organic polar solvent such as N-methylpyrrolidone, N,N-dimethylformamide and N,N-dimethylacetamide. The reaction should be carried out under substantially anhydrous conditions and at a temperature below about 150° C. Most advantageously, the reaction is carried out from about 20° to about 50° C.

The reaction time is not critical and depends primarily on the reaction temperature. It may vary from about 1 to about 24 hours, with about 2 to 4 hours at about 30° to 50° C., preferred for the nitrogen-containing solvents.

According to our invention, a corotating intermeshing twin-screw extruder is used for forming plastic end products of film, sheet, pipe, tube or profile. Powdered or pelletized polymer and other raw materials such as fillers, additives and external lubricants are delivered to a hopper and from there fed into the feed end of a barrel which houses the screws or screw-like devices that convey the material forward as it is mixed. The materials are plasticized by the frictional heat generated by the rotating screws and external heat applied through the barrel. The motion of the screws advances the material through the machine while applying shear to effect the melting and blending of polymer and additives. The melted material then leaves the extruder as a consequence of the screw action through a melt channel that is oval or round in cross-sectional shape. The cross-sectional shape of the melt channel is then changed from this oval or circular shape to the shape of the extrusion die through which the polymer is extruded to form the desired product. The product can be air-cooled for end products such as pipes, tubes or profiles. A puller may be used to maintain the part dimensions and to avoid warping. A duel belt puller such as Gatto Model 210-6P Cat-A-Puller made by the Gatto Machinery Dev. Corporation or equivalent may be used. The profile must be sufficiently cooled before entering the puller to avoid damaging the pulling surfaces or distorting the polyamide-imide profile. Saws used to cut profiles to the required lengths should have carbide tipped blades for adequate wear life.

Using conventional high-volume processing techniques, polyamide-imide resins can be injection molded into complex, precision parts or fairly large dimension parts can be extruded and then machined to close tolerances. However, injection molding and prior art extrusion processes have been unable to process extruded articles such as thin film, sheet, pipe, tube and profiles.

The melt viscosity of the polyamide-imide polymer is extremely high compared to that of thermoplastics like polyethylene or polypropylene generally considered suitable for conventional extrusion processing. The high viscosity of the polyamide-imide melt renders conventional extrusion equipment unsuitable for use in producing extruded articles. This high melt viscosity of the polyamide-imide polymer tends to stagnate the polymer melt along the walls of the melt passages such as in the extrusion dies and the adaptors between the end of the extruder and the extrusion dies. Once the polymer melt starts to stagnate on the walls of the extrusion equipment, the polymer continues to accumulate on the walls until the cross-sectional area of the extrusion equipment through which the polymer flows is reduced or completely shut off.

Difficulties have been encountered in the processing of polyamide-imide copolymers into thin sheet and films by the extrusion process because of the high melting temperature and high melt viscosities of the polymer compounds. The melt viscosity of the polyamide-imide copolymers is high compared to that of thermoplastic polymers generally considered suitable for extrusion processing into thin sheet and films. This high melt viscosity can cause the polyamide-imide melt to stagnate in the extrusion die and cause the extrusion process to come to a stop. Conversely, if enough extrusion pressure is exerted on the high viscosity polyamide-imide melt to maintain flow through the film die, the die can be mechanically destroyed or even blown apart.

Polyamide-imide materials, like most thermoplastic materials, exhibit a visco-elastic behavior in the melt state. In particular, the polyamide-imide materials are power law fluids obeying the following equation:

$$\eta = K\gamma^n$$

where
$\eta$ = apparent viscosity in centipoise
$\gamma$ = shear rate per second
K = a constant
n = a power law index In the above equation, the shear rate is the velocity gradient or the rate of change of the velocity of the thermoplastic melt, the apparent viscosity is a function of the shear rate of the polyamide-imide melt shear rate and a power law index, which is defined as the slope of the apparent viscosity versus the shear rate curve, is in the range of $-0.3$ to $-0.8$. For these polyamide-imide copolymers, the index has been found to be a weak function of temperature and only slowly decreases as the polymer melt temperature increases. It is apparent, however, from the power law equation that the polyamide-imides are shear sensitive.

In other words, the higher the applied shear rate, the lower the apparent melt viscosity. This shear thinning characteristics of the polyamide-imide compounds must be carefully considered in order to design and build extrusion film and thin sheet dies suitable for processing these polymers. This also applies to hollow tubes with outside diameters of about 0.25 inches to about 2 inches and a wall thickness of about 0.05 inches to about 0.25 inches.

The objects of the invention can be obtained by controlling the shape and size of the polyamide-imide melt flow channel within the extrusion die used to form the extruding melt into thin sheet and film. In the usual design of a sheet or film extrusion die, the thermoplastic melt leaves the extruder through a melt channel that is oval or round in cross-sectional shape. The thermoplastic melt channel is then changed from this shape to that of the cross-sectional shape of the thin sheet or film at the extrusion die exit. Conventional thermoplastic melts can be extruded through thin sheet and film dies that may be well streamlined and polished but will have cross-sectional areas which increase and decrease several times as the thermoplastic melt progresses from the die entrance to the die exit. These changing cross-sectional areas serve to restrict or adjust the thermoplastic melt flow so that adequate gauge control can be exerted on the melt as it leaves the extrusion die.

The shear thinning characteristic of polyamide-imide materials requires that an extrusion die for thin sheet and film be designed and constructed so that the shear rate (the velocity gradient of the polymer) of the melt be maintained or increased as it passes downstream through the die. By controlling the melt viscosity in this fashion, we produced polyamide-imide thin sheet and films which could not be produced by conventional thermoplastic extrusion methods.

This invention is practiced by controlling the shape and size of the polyamide-imide melt flow channels that are designed and built into the extrusion dies for the extrusion of tubes and pipes. All polyamide-imide melt flow channels must be properly streamlined and polished in order to reduce the potential for polyamide-imide melt stagnation and adherence to flow channel walls. Most importantly, the melt flow channels must be designed and built so that the polyamide-imide melt shear rate does not decrease as the melt progresses downstream from the melt extruder and through the extrusion die used to form and shape the polyamide-imide tubes and pipes.

By maintaining or increasing the polyamide-imide melt shear rate as the melt passes through the extrusion dies downstream from the extruder, it is possible to maintain or decrease the melt viscosity of the polyamide-imide. By controlling the melt viscosity in this fashion, it is possible to produce polyamide-imide tubes and pipes with physical properties comparable to properties of other polyamide-imide articles fashioned by the injection molding process.

Polyamide-imide resins, like most thermoplastics, exhibit a visco-elastic behavior in the melt phase. At these shear rates, the polyamide-imide melt is extremely viscous, flowing only when subjected to high pressure. However, as the shear rate of the polymer melt increases the apparent viscosity of the polyamide-imide decreases through the melt channel and allows the polyamide-imide melt to be made into extruded articles of about 1 to about 10 mil thick film, about 11 to about 250 mil thick sheet and pipe with outside diameters from about 0.25 to about 2 inches with wall thicknesses from about 0.05 to about 0.25 inches. The shear rates of the polyamide-imide melt can vary from about $0.1$ $sec^{-1}$ (per second) at the exit of the extruder to about $2000$ $sec^{-1}$ at the exit of the extrusion die. Shear rates for the polyamide-imide melts are calculated by standard equations for flow behavior of polymers through various geometries such as in round tubes, flow between flat plates and through rectangular ducts. These equations may be obtained from polymer processing text books such as *Processing of ThermoPlastic Materials*, edited by E. C. Bernhardt, Reinhold Publishing Corporation, New York, N.Y. (1959).

In the design of a sheet or film extrusion die for polyolefins, the thermoplastic melt leaves the extruder through a melt channel that is oval or circular in cross-sectional geometry and the channel is then changed from this shape to that of the cross-sectional geometry of thin sheet film and pipe at the extrusion die exit. Conventional thermoplastic melts can be extruded through thin sheet, film and pipe dies that may be well streamlined and polished but will have cross-sectional areas which increase and decrease in cross-sectional area sereral times between the end of the extruder and the exit of the extrusion profile die. These changing cross-sectional areas serve to restrict or adjust the thermoplastic melt flow so that adequate control can be exerted on the melt as it leaves the extrusion die. This changing in the cross-sectional area means that the shear rate exerted on the melt flowing through these channels can increase and decrease several times during flow through the melt channel.

This type of flow channel is unacceptable for the production of extruded articles from polyamide-imide since the apparent viscosity would follow the power-law fluid relationship. With a flow channel which has cross-sectional areas increasing and decreasing, the shear rate of the polymer melt will vary inversely with the cross-sectional area at a constant polymer temperature. As the shear rate or velocity of the polyamide-imide melt through a section of the flow channel decreases, the apparent viscosity of the polyamide-imide melt increases which leads to restriction of flow, stagnation and possibly complete plugging of the channel. The melt channel geometry must vary from the exit end of the extruder through the exit of the die in such a manner that the shear rate is constantly increasing from the exit of the extruder to the exit of the extrusion die. With a constantly increasing shear rate, the apparent viscosity of the polyamide-imide melt is constantly decreasing.

Referring to FIG. 1, an amide-imide copolymer is fed from hopper, 1, into a corotating, intermeshing twin-screw extruder, 2. The barrel, 3, of the twin-screw extruder is maintained at a temperature of 450° to about 600° F. The amide-imide copolymer is melted between flights of the corotating, intermeshing screws, 4, of the twin-screw extruder. An extrusion die, 5, is located at the exit of the twin-screw extruder.

Figure 2:
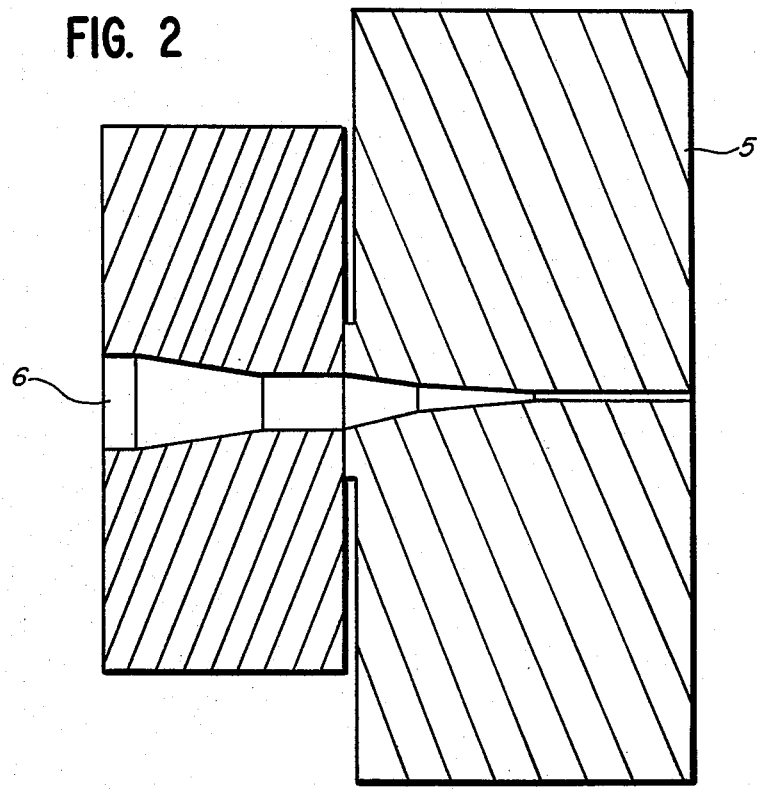
FIG. 2 is a schematic vertical-sectional side view of the melt channel and extrusion die for use in the practice of the process of this invention.

As illustrated in FIG. 2, which shows an enlarged schematic vertical-sectional view of an extrusion die for use in the process of the invention, the amide-imide copolymer melt is extruded through the melt channel, 6, of the extrusion die, 5. From the exit of the extrusion die, 5, the molten form of the article is cooled and solidified to form the desired article.

Polyamide-imide polymer melt, when processed through a single-screw extruder, tends to surge and slip, thereby not allowing a constant flow through extrusion dies. By not maintaining constant flow through the extrusion die from the single-screw extruder, the extruder products exhibit non-uniformity of thickness and also exhibits some porosity of the product. According to the invention, use of a corotating intermeshing twin-screw extruder produces the precise and constant throughput required for the production of the extruded profiles of the invention. The corotating intermeshing twin-screw extruder also gives the precise control of the polymer melt temperature to allow the extruder barrel temperatures to be operated in the range of 450°–600° F. This temperature range is about 50° to about 100° F. less than normal extruder control temperatures used for processing polyamide-imide polymers. These lower temperatures are required to lessen polymer degradation changes which occur even when temperature variation is relatively small.

It is apparent from the power-law equation that the polyamide-imides are shear sensitive—the higher the shear rate the lower the apparent melt viscosity. This shear thinning characteristic is incorporated according to the invention to produce extruded articles of dimensions previously unknown in the art. The extrusion die temperature range is from about 550° to about 680° F. These articles include film of 1 to 10 mils, sheet of 10 to 250 mils, pipe with outside diameters from about 0.25 to about 2 inches and with wall thicknesses from about 0.05 to about 0.25 inch.

According to the invention, an external lubricant or processing aid such as polytetrafluoroethylene (PTFE) at a 1 to 3% level is required to provide a lubricating film between the high viscosity polyamide-imide melt and the metal extruder barrel and screw surfaces and the extrusion die surfaces. The PTFE also minimize the adherence of the polyamide-imide melt to the metal surfaces of the extruder. The PTFE is required particularly when a thin gauge film of 1 to 10 mil thickness is being extruded.

Although fillers and additives can be added to the polyamide-imide polymer, care must be taken to exclude introducing air and moisture into the extrusion system which can lead to extruded articles which are foamed or have a porosity to them.

Extruded articles prepared according to this method can be subjected to heat treatment at temperatures generally ranging from about 200° to about 500° F. for a period of up to several days, such that the physical properties, in particular the high temperature properties, are improved. Extruded profiles, sheet and films subjected to such heat treatment are ideally suited for use in high temperature environments.

We have found that if the polyamide-imide copolymer comprises about 0.1 to about 50 percent by weight of polyetherimides, suitable molded articles are produced using our novel extrusion process.

Suitable polyetherimides comprise essentially chemically combined units of the formula:

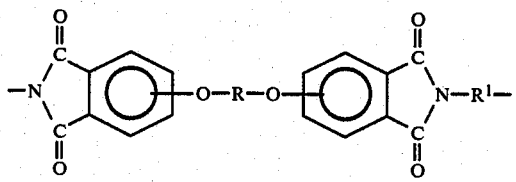

wherein R is a member selected from the class consisting of (a) the following divalent organic radicals:

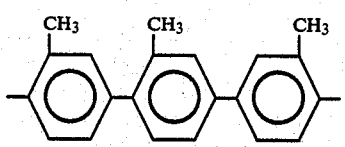

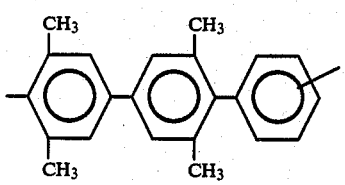

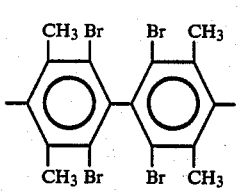

and (b) divalent organic radicals of the general formula:

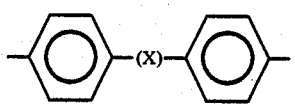

where X is $-C_yH_{2y}-$ and is a whole number equal to from 1 to 5, inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula:

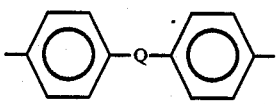

where Q is a member selected from the class consisting of:

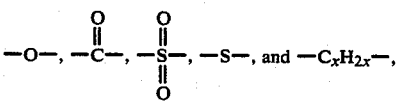

and x is a whole number equal to from 1 to 5, inclusive.

The polyetherimides which are employed in the present invention can be made in accordance with the disclosures and teachings in U.S. Pat. No. 3,847,867 issued Nov. 12, 1974. The polyamide-imides employed in the practice of the instant invention can also be made in accordance with the disclosures and teachings in U.S. Pat. No. 4,016,140. By reference, both of these patents are made part of the disclosures and teachings of the instant application.

We have also found that if the polyamide-imide copolymers comprise about 0.1 to about 50 percent by weight of polysulfones, suitable molded articles are obtained using our novel extrusion process. Suitable polysulfones comprise recurring units of the following structure:

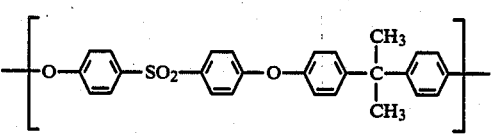

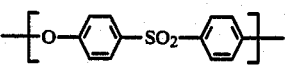

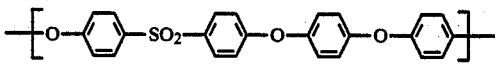

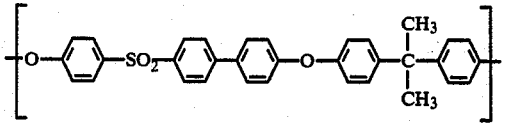

-continued

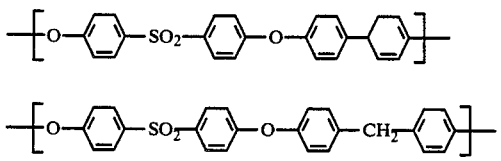

Suitable processes for the manufacture of the sulfones are disclosed in U.S. Pat. Nos. 4,232,142 and 4,051,109 incorporated herein by reference and made part of this application.

The following examples illustrate the invention but are not intended to limit the scope thereof.

EXAMPLE 1

A predominantly amic acid group containing polymer having a spiral flow of 7.5 inches at 600° F. and 20,950 psi and an estimated melt flow rate of about 30 to 50 g/10 min. at 620° F. was prepared according to the following procedure: 17.3 parts by weight of the 4-acyl chloride derivative of trimellitic acid anhydride (TMAC), 11.5 parts by weight oxybis(aniline), and 2.7 parts by weight metaphenylenediamine were polymerized in 68.5 parts by weight dimethylacetamide in a jacketed 1000 gallon glass-lined Pfaudler reactor equipped with a mechanical stirrer and nitrogen purge. The TMAC was added over 3 to 4 hours, temperature increasing from 40° to 50° F. to a peak of 90° to 100° F. during such addition. Polymerization was continued for another 4 to 5 hours following completion of TMAC addition after which the polymer was precipitated with deionized water using a Fitz Comminuting Mill manufactured by Fitzpatrick Corp. The precipitated polymer was then washed four times with deionized water and then flash dried at 250° F. and steam dried at 300° F. A sample of this polymer, in the form of powder, was further dried for 16 hours in a vacuum oven at 250° F. After drying, the powdered polymer was blended with 3 wt. % TiO$_2$ at 600° F. and formed into pellets using a Colombo RC-9 twin-screw extruder manufactured by the Italian firm Lavorazione Materie Plastiche. The TiO$_2$ was used as a color pigment.

The polyamide-imide material produced above was fed in its pelletized form into a ZSK-30 Werner & Pfleiderer twin-screw extruder. The extrusion conditions were as follows:

| Barrel Temperatures | |
| --- | --- |
| Zone 1 (feed) | 480° F. |
| Zone 2 | 500° F. |
| Zone 3 | 520° F. |
| Zone 4 | 540° F. |
| Zone 5 | 560° F. |
| Zone 6 | 590° F. |
| Die | 630° F. |

The screws were 890 mm long and started with a 42 mm pitch at the feed end. At a point 525 mm from the feed end, the pitch was changed to 28 mm. These screws were operated at 50 rpm with a feed rate of 14 lbs/hour of polyamide-imide pellets.

An extrusion die of the shape shown in FIG. 2, was attached to the exit end of the ZSK-30 extruder. The melt channel and extruder die design were streamlined with a shear rate of about 0.1 sec$^{-1}$ at the inlet of the melt channel and a shear rate of about 950 sec$^{-1}$ at the exit of the extrusion die.

According to the invention, polyamide-imide materials have been extruded into film using the above-described techniques and processing conditions. Specifically, using techniques according to the invention, films were produced with a gauge of 6.5 mils and a width of 6 inches. The film was extruded as an endless article in the manner typical for the extrusion of thermoplastic films. The film was heat treated at 330° F. for 24 hours, 475° F. for 24 hours and 500° F. for 24 hours and subjected to physical property testing. The following results were measured:

| Property | Machine Direction | Transverse Direction |
| --- | --- | --- |
| Tensile Strength, psi | 19,440 | 17,460 |
| Elongation, % | 18.8 | 14.8 |
| Tensile Modulus, psi | 405,600 | 414,700 |

EXAMPLE 2

Using the process techniques, equipment and polyamide-imide polymer as prepared in Example 1 but containing 20% polyetherimide (Ultem 1000) and with these processing conditions a thin film was extruded:

| Barrel Temperatures | |
| --- | --- |
| Zone 1 (feed) | 500° F. |
| Zone 2 | 520° F. |
| Zone 3 | 540° F. |
| Zone 4 | 560° F. |
| Zone 5 | 580° F. |
| Zone 6 | 600° F. |
| Die | 665° F. |

The polyamide-imide compound film produced was 0.003 inch in gauge and 6 inches in width. The properties of the film were:

| Property | Machine Direction | Transverse Direction |
| --- | --- | --- |
| Tensile Strength, psi | 15,900 | 13,870 |
| Elongation, % | 20.9 | 14.3 |
| Tensile Modulus, psi | 366,600 | 339,400 |

EXAMPLE 3

Using the process techniques, equipment and polyamide-imide as prepared according to the process of Example 1, and with processing conditions as follows, a film was extruded:

| Barrel Temperatures | |
| --- | --- |
| Zone 1 (feed) | 500° F. |
| Zone 2 | 520° F. |
| Zone 3 | 540° F. |
| Zone 4 | 560° F. |
| Zone 5 | 580° F. |
| Zone 6 | 600° F. |
| Die | 675° F. |

The polyamide-imide compound film produced was 0.010 inch in gauge and 6 inches in width. The properties of the film were as follows:

| Property | Machine Direction | Transverse Direction |
|---|---|---|
| Tensile Strength, psi | 18,150 | 16,900 |
| Elongation, % | 15 | 17 |
| Tensile Modulus psi | 402,300 | 409,600 |

EXAMPLE 4

A polyamide-imide material produced by the method given in Example 1 was dried for 16 hr at 300° F. and 1% of PTFE was added externally to the polymer pellets. A feed rate of 20 lbs/hr was fed to the ZSK-30 twin-screw extruder, as described in Example 1 an extrusion die used to form pipe was attached to the end of the extruder. The operating temperatures of the extruder were:

| Barrel Temperatures | |
|---|---|
| Zone 1 (feed) | 470° F. |
| Zone 2 | 490° F. |
| Zone 3 | 510° F. |
| Zone 4 | 530° F. |
| Zone 5 | 545° F. |
| Zone 6 | 545° F. |
| Die | 600° F. |

The shear rate at the entrance of the melt channel was about 0.5 per second and at the exit of the extruder die the shear rate was about 45 per second at 20 lbs/hour. The mandrel support spider must have a sufficient multiplicity of support legs so that the extruded profile is essentially the desired shape of the pipe. Dimensions and physical properties of the pipe produced from the polyamide-imide were as follows:
Outside diameter, inches: 1.00
Wall thickness, inches: 0.055
Specific gravity: 1.40
Tensile strength, psi: 17,600
Burst strength, psi: 1,000

We claim:

1. A process for extruding an article from an amide-imide copolymer, said process comprising:
   (a) feeding said amide-imide copolymer and an external lubricant into a corotating, intermeshing twin-screw extruder, said extruder having a barrel temperature of about 450° to about 600° F.;
   (b) melting said amide-imide copolymer between flights of corotating, intermeshing screws of said extruder to form an amide-imide copolymer melt;
   (c) passing said amide-imide copolymer melt into a melt channel of an extrusion die, said die being attached to the exit of said extruder;
   (d) heating said extrusion die to maintain the copolymer as a melt;
   (e) passing said copolymer melt through said melt channel, said melt channel having a geometry which provides a constantly increasing shear rate in said copolymer melt;
   (f) extruding said copolymer melt out of the exit of said extrusion die, said exit having a shape to form said article in molten form; and
   (g) solidifying the molten form after it has been extruded from said die to provide said article.

2. The process of claim 1 wherein said amide-imide copolymer comprises units of:

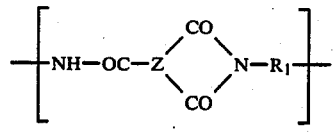

and units of:

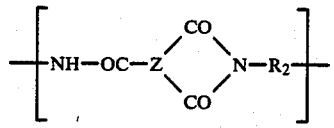

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from about 6 to about 10 carbon atoms or two divalent aromatic hydrocarbons joined directly or by stable linkages selected from the group consisting of —O—, methylene, —C—, —$SO_2$—, and —S— radicals and where said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

3. The process according to claim 2 wherein the extruded article is a thin film of about 1 to about 15 mils in thickness.

4. The process of claim 2 wherein the extruded article is in the form of a sheet of about 10 to about 250 mils in thickness.

5. The process of claim 2 wherein the extruded article is in the form of a hollow tube with an outside diameter of about 0.25 inch to about 2 inches and a wall thickness of about 0.05 inch to about 0.25 inch.

6. The process of claim 2 wherein the shear rate is about 0.5 per second to about 200 per second.

7. The process of claim 1 wherein the external lubricant is polytetrafluoroethylene.

8. The process of claim 6 wherein about 1 to about 2 percent by weight of the total copolymer is tetrafluoroethylene.

9. The process of claim 2 wherein about 0.1 to about 50 percent by weight polyetherimide is added to the copolymer prior to extrusion.

10. The process of claim 9 wherein the polyetherimide is of the following formula:

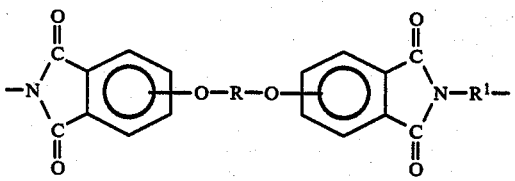

where R is a member selected from the class consisting of (a) the following divalent organic radicals:

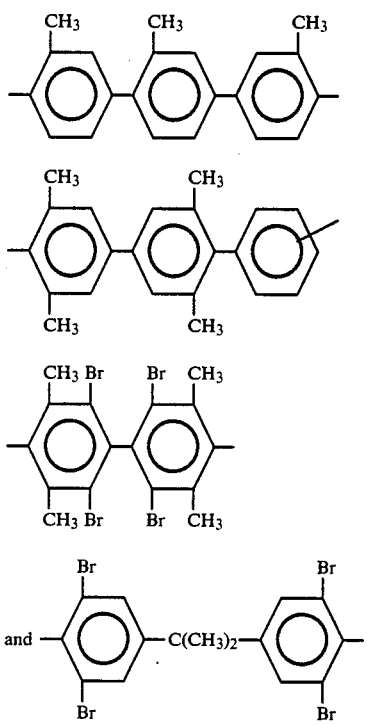

and (b) divalent organic radicals of the general formula:

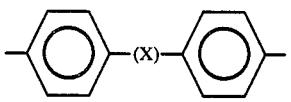

where X is —C_yH_{2y}—, Y is a whole number equal to from 1 to 5, inclusive, and $R^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2–20 carbon atoms, (c) $C_{(2-8)}$ alkylene terminated polydiorganosiloxanes, and (d) divalent radicals included by the formula:

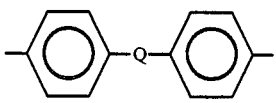

where Q is a member selected from the class consisting of:

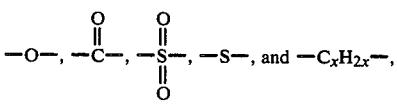

and x is a whole number equal to from 1 to 5, inclusive.

11. The process of claim 2 wherein about 0.1 to about 50 percent by weight of polysulfone is added to the copolymer prior to extrusion.

12. The process of claim 11 wherein the polysulfones comprise recurring units of the following structure:

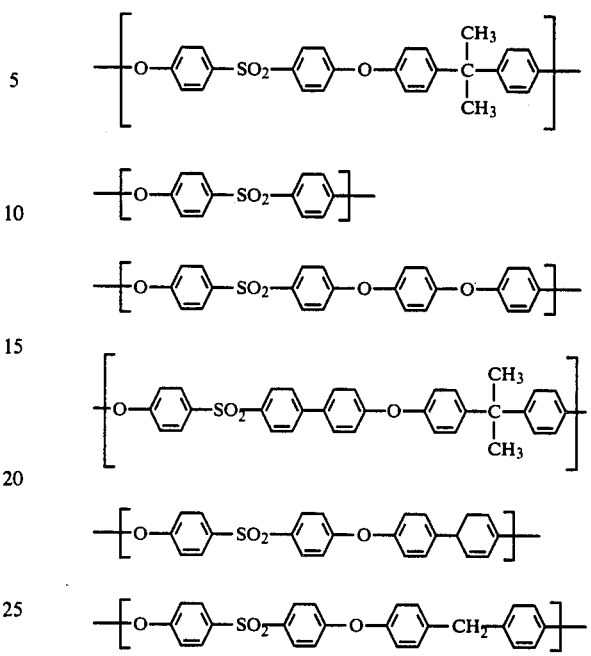

13. The process of claim 1 wherein said external lubricant comprises about 0.5 to about 3 weight percent based on said copolymers.

14. The process of claim 1 wherein said shear rate increases from about 0.1 per second to about 2000 per second.

15. The process of claim 1 wherein said amide-imide copolymer comprises A units of:

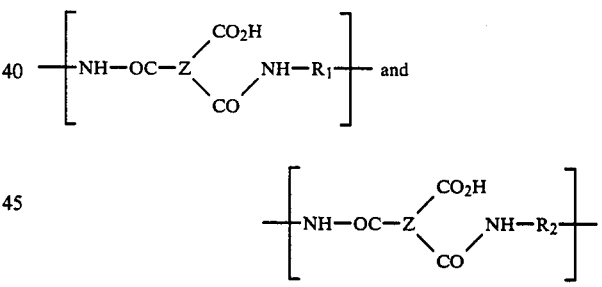

wherein the free carboxyl groups are ortho to one amide group and comprises B units of:

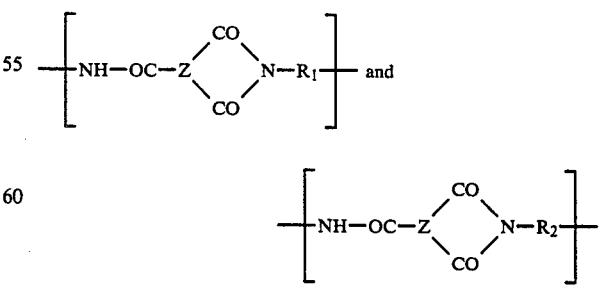

wherein one carbonyl group is meta to, and one carbonyl group is para to each amide group and wherein Z is a trivalent benzene ring or lower-alkyl-substituted trivalent benzene ring, $R_1$ and $R_2$ are different and are divalent aromatic hydrocarbon radicals of about 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein the proportions of A and B units run from about 1 mole percent A units and about 99 mole percent B units to about 99 mole percent A units and about 1 mole percent B units and wherein the R$_1$ and R$_2$ containing components of the A and B units run from about 10 mole percent R$_1$ containing components and about 90 mole percent R$_2$ containing components to about 90 mole percent R$_1$ containing components and about 10 mole percent R$_2$ containing components.

16. The process of claim 15 wherein said external lubricant comprises about 0.5 to about 3 weight percent based on said copolymers.

17. The process of claim 15 wherein said shear rate increases from about 0.1 per second to about 2000 per second.

18. A process for extruding an article comprising:
(a) feeding an amide-imide copolymer and about 0.5 to about 3.0 percent by weight of polytetrafluoroethylene into a corotating, intermeshing twin-screw extruder having a barrel temperature of about 450° to about 680° F., wherein a major proportion of said amide-imide copolymer comprises a repeating structural unit represented by the formula

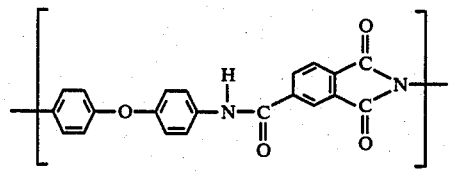

(b) melting said amide-imide copolymer between flights of corotating, intermeshing screws of said extruder to form an amide-imide copolymer melt;
(c) passing said amide-imide copolymer melt into a melt channel of an extrusion die which is attached to the exit of said extruder;
(d) heating said extrusion die to a temperature of about 550° to about 680° F. to maintain the copolymer as a melt;
(e) passing said copolymer melt through said melt channel, said melt channel having a geometry which imparts a constantly increasing shear rate of about 0.1 per second to about 2000 per second to the copolymer melt being extruded through the melt channel;
(f) extruding said copolymer melt out of the exit of said extrusion die, said exit having a shape to form said article in molten form; and
(g) solidifying the molten form after it has been extruded from said die to provide said article.

19. The process according to claim 15 wherein the extruded article is a thin film of about 1 to about 15 mils in thickness.

20. The process of claim 15 wherein the extruded article is in the form of a sheet of about 10 to about 250 mils in thickness.

21. The process of claim 15 wherein the extruded article is in the form of a hollow tube with an outside diameter of about 0.25 inch to about 2 inches and a wall thickness of about 0.05 inch to about 0.25 inch.

22. The process of claim 15 wherein the shear rate is about 0.5 per second to about 200 per second.

23. The process of claim 15 wherein the external lubricant is polytetrafluoroethylene.

24. The process of claim 15 wherein about 1 to about 2 percent by weight of the total copolymer is tetrafluoroethylene.

25. The process of claim 15 wherein about 0.1 to about 50 percent by weight polyetherimides are added to the copolymer prior to extrusion.

26. The process of claim 15 wherein the polyetherimide is of the following formula:

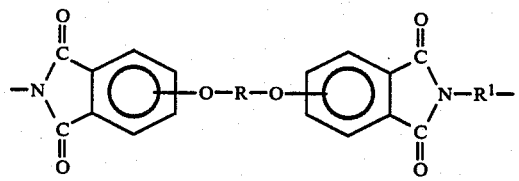

where R is a member selected from the class consisting of (a) the following divalent organic radicals:

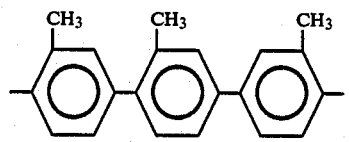

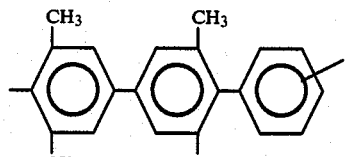

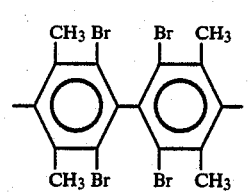

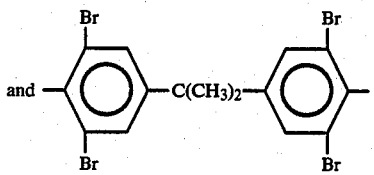

and (b) divalent organic radicals of the general formula:

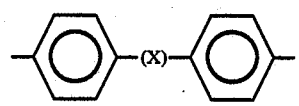

where X is —C$_y$H$_{2y}$—, Y is a whole number equal to from 1 to 5, inclusive, and R$^1$ is a divalent organic radical selected from the class consisting of (a) aromatic hydrocarbon radicals having from 6–20 carbon atoms and halogenated derivatives thereof, (b) alkylene radicals and cycloalkylene radicals having from 2-20 carbon atoms, (c) C$_{(2-8)}$ alkylene terminated polydiorganosiloxanes, and (d) divalent radicals included by the formula:

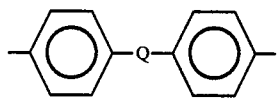

where Q is a member selected from the class consisting of:

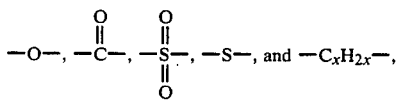

and x is a whole number equal to from 1 to 5, inclusive.

27. The process of claim 15 wherein about 0.1 to about 50 percent by weight of polysulfones are added to the copolymer prior to extrusion.

28. The process of claim 27 wherein the polysulfones comprise recurring units of the following structure:

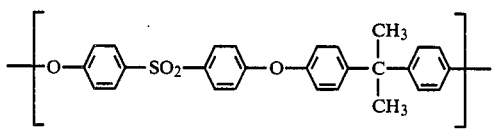

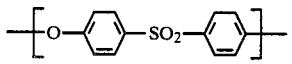

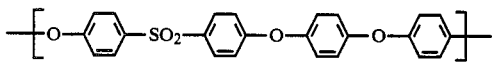

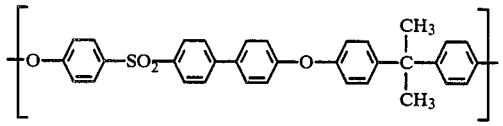

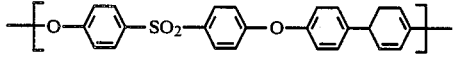

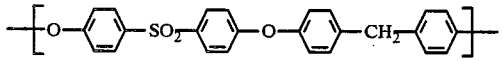

29. The process of claim 2 wherein R$_1$ of the copolymer is

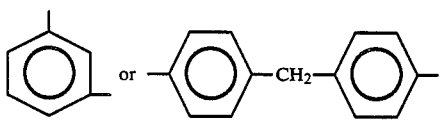

and R$_2$ is

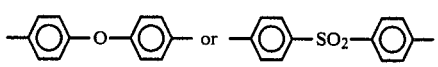

or wherein R$_1$ is

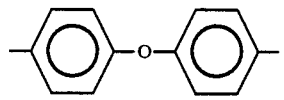

and R$_2$ is

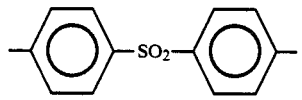

30. The process of claim 9 wherein R$_1$ of the copolymer is

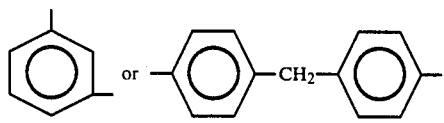

and R$_2$ is

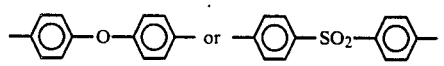

or wherein R$_1$ is

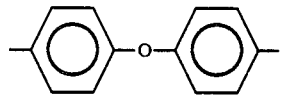

and R$_2$ is

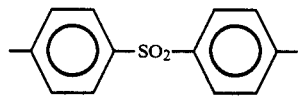

31. The process of claim 15 wherein R$_1$ of the copolymer is

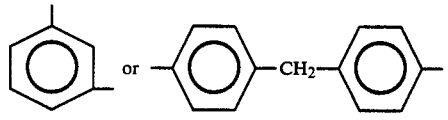

and R$_2$ is

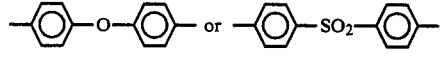

or wherein R$_1$ is

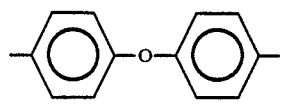

and R$_2$ is

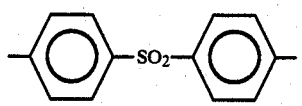

32. The process of claim 2 wherein Z of the copolymer is a trivalent benzene ring, $R_1$ is

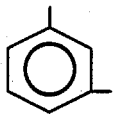

and $R_2$ is

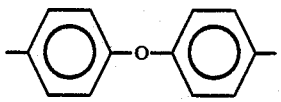

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

33. The process of claim 15 wherein Z of the copolymer is a trivalent benzene ring, $R_1$ is

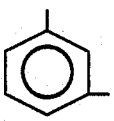

and $R_2$ is

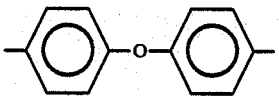

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

34. The process of claim 11 wherein $R_1$ of the copolymer is

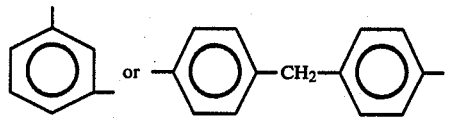

and $R_2$ is

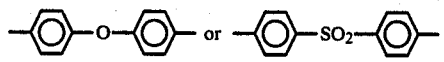

or wherein $R_1$ is

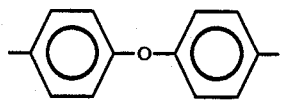

and $R_2$ is

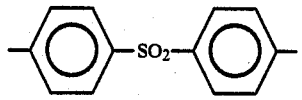

35. As an article of manufacture, a thin film of about 1 to about 15 mils thickness prepared by the process of claim 2.

36. As an article of manufacture a sheet of about 10 to about 250 mils in thickness prepared by the process of claim 2.

37. A hollow tube with outside diameter of about 0.25 inch to about 2 inches and a wall thickness of about 0.05 inch to about 0.25 inch prepared by the process of claim 2.

38. An an article of manufacture, a thin film of about 1 to about 15 mils thickness prepared by the process of claim 15.

39. As an article of manufacture a sheet of about 10 to about 250 mils in thickness prepared by the process of claim 15.

40. A hollow tube with outside diameter of about 0.25 inch to about 2 inches and a wall thickness of about 0.05 inch to about 0.25 inch prepared by the process of claim 15.

* * * * *

UNITED STATES PATENT OFFICE
CERTIFICATE OF CORRECTION

Patent No. 4,581,264          Dated April 8, 1986

Inventor(s) Donald B. Emery and Brian C. Connolly

It is certified that error appears in the above-identified patent and that said Letters Patent are hereby corrected as shown below:

Col. Line 4  27   "more" and should read --most--

4  50   "-SO-" and should read ---$SO_2$---

22  41   "An" and should read --As--

Signed and Sealed this

Twenty-sixth Day of August 1986

[SEAL]

Attest:

DONALD J. QUIGG

Attesting Officer    Commissioner of Patents and Trademarks